United States Patent [19]

Sundberg

[11] Patent Number: 4,861,181
[45] Date of Patent: Aug. 29, 1989

[54] REMOVABLY PLUGGING ELEMENT CHANNELS

[75] Inventor: Staffan Sundberg, Hofors, Sweden

[73] Assignee: Ovako Steel Couplings AB, Sweden

[21] Appl. No.: 242,825

[22] Filed: Sep. 9, 1988

[30] Foreign Application Priority Data

Sep. 11, 1987 [SE] Sweden .................. 8703525

[51] Int. Cl.$^4$ ............................................. F16D 1/06
[52] U.S. Cl. ..................... 403/15; 403/374;
403/368
[58] Field of Search ............... 403/15, 16, 374, 368;
29/523, 157.4, 157.3 R

[56] References Cited

U.S. PATENT DOCUMENTS

| | | | |
|---|---|---|---|
| 2,010,057 | 8/1935 | Buckwalter | 403/15 |
| 2,840,399 | 6/1958 | Harless et al. | 403/15 |
| 3,525,365 | 8/1970 | Meulendyk, et al. | 138/89 |
| 3,690,707 | 9/1972 | van Rooij | 403/15 |

FOREIGN PATENT DOCUMENTS

| | | | |
|---|---|---|---|
| 2492022 | 10/1980 | France . | |
| 361513 | 5/1973 | Sweden . | |
| 410034 | 9/1979 | Sweden . | |
| 567191 | 9/1975 | Switzerland | 403/15 |

Primary Examiner—Randolph A. Reese
Assistant Examiner—Carol I. Bordas
Attorney, Agent, or Firm—Osterlenk, Faber, Gerb & Soffen

[57] ABSTRACT

A method and a expansion plug for removably plugging a channel (2) in an element (1), particularly a hollow turbine shaft, the expansion plug being inserted into the one end of the channel and expanded therein. For this purpose a plug is used of the kind comprising a sleeve (4) whose outer wall (5) having such dimension that the sleeve can easily be inserted into the channel. The inner wall (9) of the sleeve is slightly conical. A conical stopper (11) is arranged in the sleeve (4) in order to expand the sleeve (4) by axial displacement therein, to engagement with the channel wall. The end of the sleeve (4) with larger diameter is closed. The plug is provided with a channel (18) extending between these two ends. Oil is forced through the channel (18) to a closed space (14) between the inner end of the stopper (11) and the closed end of the sleeve (4) to cause expansion of the plug. The plug (3) is dismantled by injecting oil between the stopper (11) and the inner wall (9) of the sleeve (4) through the channel (20) extending between the exposed end surface of the plug (11) and the curved surface (12) of the plug (11).

2 Claims, 1 Drawing Sheet

REMOVABLY PLUGGING ELEMENT CHANNELS

The present invention relates to a method of removably plugging a channel in an element such as a hollow shaft, by inserting a plug into the channel, said plug comprising a sleeve whose outer wall fits against the wall of the channel and whose inner wall is slightly conical, and a conical stopper fitting the inner wall of the sleeve, the stopper being displaced in the sleeve causing it to expand to engage with the channel wall. The invention also relates to an expansion plug for performing the method.

Hollow shafts are often used in steam turbines, for instance. The ends of these hollow shafts are provided with plugs which are fitted by conventional shrinkage methods. Every time the steam turbine is to be overhauled, these plugs are drilled out and the interior of the shaft is inspected for cracks. Plugs are applied once more by the shrinkage method when the inspection has been completed. This is a time-consuming and sometimes troublesome operation.

The described application for plugging a channel in an element is only one example and it should be evident that an improved plugging method has innumerable applications besides turbine shafts.

One object of the invention is to describe a method and a plug for removably plugging a channel in an element, particularly hollow shafts in steam turbines, allowing the plug to be easily fitted and dismantled without it being destroyed. Another object is to demonstrate a method which permits the plug to be fitted and dismantled without changes in temperature, as well as providing a plug equally as reliable and tight as plugs applied by the shrinkage method.

A method of removably plugging a channel in an element, particularly the hollow shaft of a steam turbine by inserting a plug into the channel, said plug comprising a sleeve whose outer diameter is somewhat less than the diameter of the channel and whose inner wall is slightly conical, and a conical stopper fitting the inner wall of the sleeve, the stopper being axially displaced in the sleeve causing it to expand to engage with the channel wall, the method being substantially characterised in that the end of the sleeve having larger inner diameter is sealed and that the plug is caused to expand the sleeve by injecting a pressure medium such as oil into the space between the stopper and the closed end of the sleeve, whereby the plug can be dismantled by injection oil between the adjacent surfaces of the stopper and the sleeve. The pressure media for expanding and dismantling the plug, respectively, are introduced through separate channels connectable to respective pressure medium sources at an exposed surface of the plug inserted into the channel.

An expansion plug for performing the method comprising a sleeve, the outer diameter of which is somewhat less than the inner diameter of the channel, and the inner wall of which is slightly conical, and a slightly conical stopper arranged in the sleeve, said stopper fitting the inner wall of the sleeve, and this expansion plug is characterised according to the invention in that the end of the sleeve having larger inner diameter is closed, that the plug is provided with a first channel for injecting pressure medium, said channel extending from one end surface of the plug to the space between the stopper and the closed end of the sleeve to cause expansion of the plug, and that the plug is provided with a second channel for injecting pressure medium, preferably oil, said channel extending from one end surface of the plug to the contact surface between the stopper and the sleeve to permit dismantling of the plug.

Both channels preferably extend through the stopper.

The invention, defined in the appended claims, will now be described in the form of one embodiment by way of example, with reference to the accompanying drawing.

BRIEF DESCRIPTION OF THE DRAWINGS

The FIGURE of the accompanying drawing illustrates schematically an axial section through a turbine shaft with a plug according to the invention.

DETAILED DESCRIPTION OF THE PREFERRED EMBODIMENT

Figure 1:
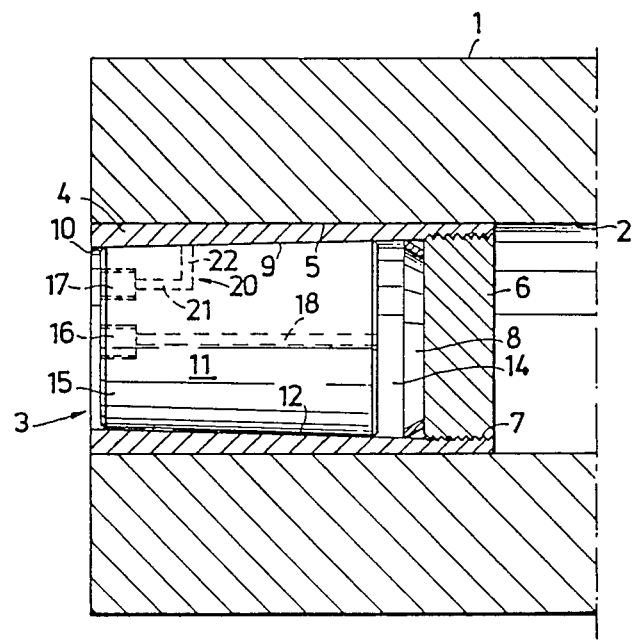

A hole has been drilled to form a central channel 2 in a turbine shaft 1. The shaft 1 can be inspected for cracks via the channel 2. However, in order to avoid damage to the shaft, the channel 2 is plugged at both ends. For this purpose a removable expansion plug, generally designated 3, is utilized according to the invention.

The plug 3 comprises an expansion sleeve 4, the diameter of its outer surface 5 substantially corresponding to the diameter of the channel 2, preferably somewhat smaller, permitting the plug 3 to be inserted easily into the channel 2. The inner end of the sleeve is provided with a tightly sealed lid 6. The lid 6 may be connected to the sleeve 4 by means of a screw joint 7, for instance, and be provided with a seal 8 sealing against the inner wall 9 of the sleeve 4. The inner wall 9 is slightly conical and converges towards the open end 10 of the sleeve 4. A stopper 11 is inserted in the sleeve 4. The stopper 11 has a slightly conical outer surface 12 corresponding to the inner surface 9 of the sleeve 4. When the stopper 11 is in close contact with the sleeve 4, a space 14 exists between the inner end of the stopper and the lid 6 with its seal 8. The stopper can be inserted into the sleeve from its wider end before the lid is fitted.

Two connections 16 and 17 are provided in the exposed end 15 of the stopper 11, to which pressure-medium sources, preferably pressure oil sources, can be connected by screw joints or the like. A first channel 18 extends from connection 16 to the inner end of the stopper 11. Pressure medium supplied via connection 16 and first channel 18 to space 14 will force the stopper 11 away from the lid 6 so that the sleeve 4 is expanded, thus firmly engaging the surface of the channel 2. The conicity of the surfaces 9 and 12 is such that the joint is stable even after pressure-relief of the space 14.

A second channel 20 formed by an axial drill-hole 21 and a radial drill-hole 22, extend from connection 17 to the surface of the stopper 11. By injecting oil with the aid of the pressure-oil method, between the stopper 11 and the expansion sleeve 4 from a pressure-oil source via the connection 17 and second channel 20, the stopper 11 can easily be moved to the right in the drawing and the entire plug 3 can then easily be removed.

Suitable pressure oil sources for connection to the connections 16, 17 are already commercially available, such as those used in what is known as the pressure-oil method.

A preferred embodiment of the plug has been illustrated in the drawing, but it should be evident that the plug can be varied within the scope of the appended claims. For example, the closed end of the sleeve may be closed by conventional means other than the screw-on lid and seal shown here.

I claim:

1. An expansion plug for removably plugging a channel in an element, such as a turbine shaft in the form of a hollow shaft, said plug comprising:

a sleeve having an outer dimension, an end, and an inner curved wall, the outer dimension of the sleeve permitting the plug to be easily inserted into the channel, the inner curved wall of the sleeve being slightly conical so that the end of the sleeve has a relatively large internal diameter; and a conical stopper arranged in the sleeve and fitting the inner curved wall of the sleeve, the stopper having two ends and an outer surface, the outer surface of the stopper and the inner curved wall of the sleeve defining a boundary surface therebetween; and wherein the end of the sleeve having the relatively large inner diameter is closed, wherein the plug is provided with a first channel for injecting pressure medium, the first channel extending from one end of the plug to a space between the stopper and the closed end of the sleeve to cause expansion of the plug, and wherein the plug is provided with a second channel for injecting pressure medium, the second channel extending from the one end of the plug to the boundary surface between the outer surface of the stopper and the inner curved wall of the sleeve for dismantling the plug; and wherein the closed end of the sleeve comprises a lid which is connected by an outer screw-thread to an inner screw-thread in the sleeve, a seal applied on the inside of the lid being designed to seal against the inner curved wall of the sleeve.

2. The plug of claim 1, wherein the first channel extends between the two ends of the stopper.

* * * * *